United States Patent [19]

Kronhamn

[11] Patent Number: 5,504,489
[45] Date of Patent: Apr. 2, 1996

[54] METHOD FOR RANGE DETERMINATION

[75] Inventor: Thomas R. Kronhamn, Hälsö, Sweden

[73] Assignee: Telefonaktiebolaget LM Ericsson, Stockholm, Sweden

[21] Appl. No.: 343,907

[22] Filed: Nov. 17, 1994

[30] Foreign Application Priority Data

Nov. 17, 1993 [SE] Sweden .................................. 9303807

[51] Int. Cl.$^6$ .................................................. G01S 13/06
[52] U.S. Cl. .......................... 342/118; 342/133; 342/145; 342/146; 342/125
[58] Field of Search .................................. 342/118, 125, 342/126, 133, 145, 146

[56] References Cited

U.S. PATENT DOCUMENTS

| | | | |
|---|---|---|---|
| 5,045,860 | 9/1991 | Hodson | 342/451 |
| 5,075,694 | 12/1991 | Donnangelo et al. | 342/455 |
| 5,105,198 | 4/1992 | Inamiya | 342/457 |
| 5,128,684 | 7/1992 | Brown | 342/189 |
| 5,160,935 | 11/1992 | Inamiya | 342/357 |
| 5,196,856 | 3/1993 | Litchford et al. | 342/455 |
| 5,332,998 | 7/1994 | Avignon et al. | 342/64 |
| 5,382,957 | 1/1995 | Blume | 342/43 |
| 5,450,329 | 9/1995 | Tanner | 364/449 |

OTHER PUBLICATIONS

F. Martinerie et al., "Data Association and Tracking From Distributed Sensors Using Hidden Markov Models and Dynamic Programming: The Diamant Algorithm", *Signal Processing VI Theories and Applications,* Proceedings of EUSIPCO–92, Sixth European Signal Processing Conference, Brussels, Belgium, Aug. 24–27, 1992, pp. 1821–1824.

*Primary Examiner*—John B. Sotomayor
*Attorney, Agent, or Firm*—Burns, Doane, Swecker & Mathis

[57] ABSTRACT

A method for determination of positions of measurement objects from a number of measurements of the directions to the measurement objects made at separate points in time. During the initial measurements of the directions to the measurement objects, a number of assumed areas, within which the measurement objects are assumed to be located, are established along the direction to each measurement object. Subsequent measurements of the directions to the measurement objects are performed from at least two different measurement stations, which between the points in time are moved along different paths. In connection with the measurement of the directions to the measurement objects, the positions of the assumed areas are compared with the expected appearances of the measurement objects, and the assumed areas which exhibit the best correlation to the expected appearances of the corresponding measurement object are assumed to represent the positions of the measurement objects.

8 Claims, 4 Drawing Sheets

METHOD FOR RANGE DETERMINATION

BACKGROUND

The present invention relates to a method for determination of positions of objects.

In order to determine the distance between fixed or mobile measuring locations and fixed or mobile measurement objects, a number of different methods are known which are adapted to different types of measurement equipment. Certain methods may be described as active in the sense that the measurement equipment illuminates the measurement object, for example by means of laser light or radio frequency signals such as radar pulses. Other methods may be said to be passive due to the fact that the measuring object's own radiation is utilized during the measurement. In these cases, the range determination is carried out almost exclusively indirectly by means of angular measurements. The properties of the measurement object within the range of visible light are thus used for determining the direction to the measurement object by means of optical methods, the heat radiation of the measurement object by means of measurements with infrared-sensitive equipment or, if the measurement object itself emits sound or radio frequency radiation, by means of receiver equipment for these frequencies, for example a sonar or a "listening" radar, respectively.

The passive methods for determining the range (and thus also the position) of a measurement object have the property of not distorting the measurement object, which is an advantage in many applications, but on the other hand the position of the measurement object can not be determined by means of measurements from a single measuring location. If the measurement object is mobile, a time factor is also added—measurements from different measuring locations must be coordinated in time.

Different passive methods for range determination by means of angular measurements are known. One method which nowadays is called TMA (Target Motion Analysis) is known from the Second World War, during which it was utilized by submarines for determining the range and course of the target. The method is based on the fact that by means of passive sonar equipment, the direction to the target is determined while the submarine moves in a certain fashion. Thus, a course is firstly followed which leads away from the target direction and thereafter back towards the original target direction. During these two legs, repeated measurements of the direction to the target are made. By assuming that the speed and course of the target are constant, the location and movement of the target may be calculated by means of the angular measurements and known algorithms.

The difficulties with the method are primarily to decide how long the legs should be and to decide in which direction it is most advantageous to steer. Long legs (a large measurements base) are required in order to obtain a high accuracy of the measurements when the distance to the target object is long. If the distance is short, there is however no time or need for long legs. The problem is that there is no basis for decisions regarding the length of the legs until, at the earliest, the beginning of the second leg. The problem is particularly serious if the first leg happens to be chosen in the direction which gives a small or, in the worst case, no change of the direction to the measurement object.

The object of the present invention is thus to provide a measuring method by means of which it is possible to determine the position of a measurement object in a quicker way by means of angular measurements, and with a higher measuring accuracy than in previously known methods.

SUMMARY

Said object is achieved by means of a method according to the present invention, the features of which will become apparent from the following description. In accordance with the invention, the method for determining a position of a measurement object from a number of measurements of directions to the measurement object made at separate points in time includes the step of generating a number of assumed areas within which the measurement object is assumed to be positioned for an initial measurement of the direction to the measurement object, these areas being assumed to be positioned along the direction to the measurement object. Also, the method includes the steps of subsequently measuring directions to the measurement object from at least two different measurement stations which are moved along different paths between the points in time, and in connection with the measurements of the direction to the measurement object, comparing the measurements of the direction with expected positions of the measurement object which, for each assumed area, are based on assumptions regarding the movement of the measurement object and differences between expected and measured positions. The method further includes the step of selecting the assumed areas corresponding best to the expected positions of the measurement object as the positions of the measurement object.

DETAILED DESCRIPTION

The invention will now be described in greater detail in the form of an example with reference to FIGS. 1–7.

Figure 1:
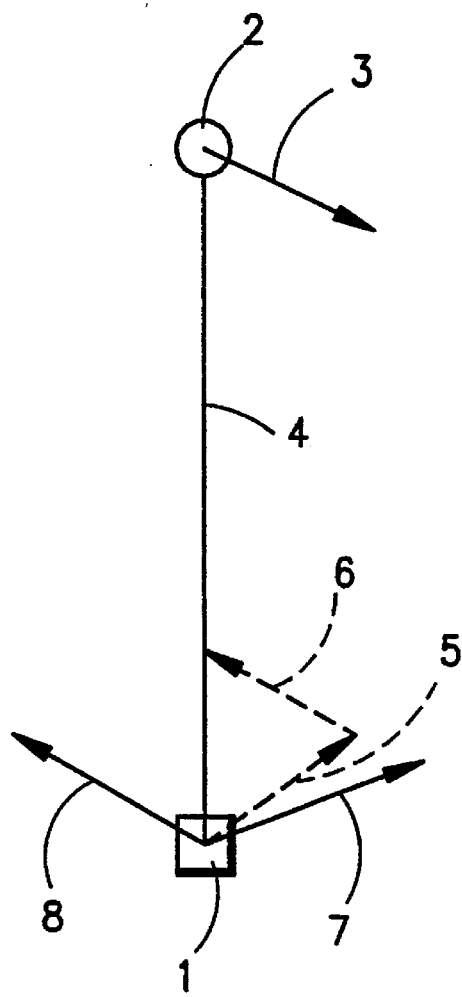
FIG. 1 shows one of the differences between a known method for determining the position of a measurement object and the method according to the invention.

FIG. 1 shows a measurement station 1 and a measurement object 2. The measurement object is assumed to move in a direction 3. The reference numeral 4 denotes the line of sight between the measurement station and the measurement object in an initial position. If the above-mentioned TMA method had been used, the measurement station would for example be moved in a path consisting of two legs 5 and 6. During the movement, repeated angular measurements are made in relation to the measurement object, by means of which measurements the position of the measurement object may be determined.

The method according to the invention is based on the fact that two measurement stations are utilized. These are moved simultaneously along the paths 7 and 8, i.e. they move away from the original line of sight on its opposite sides. During the movement along the paths 7 and 8, angular measurements towards the measurement object are made, whereby the result of the measurements from the two measurement stations is compiled in a way which is described in the following.

Figure 2:
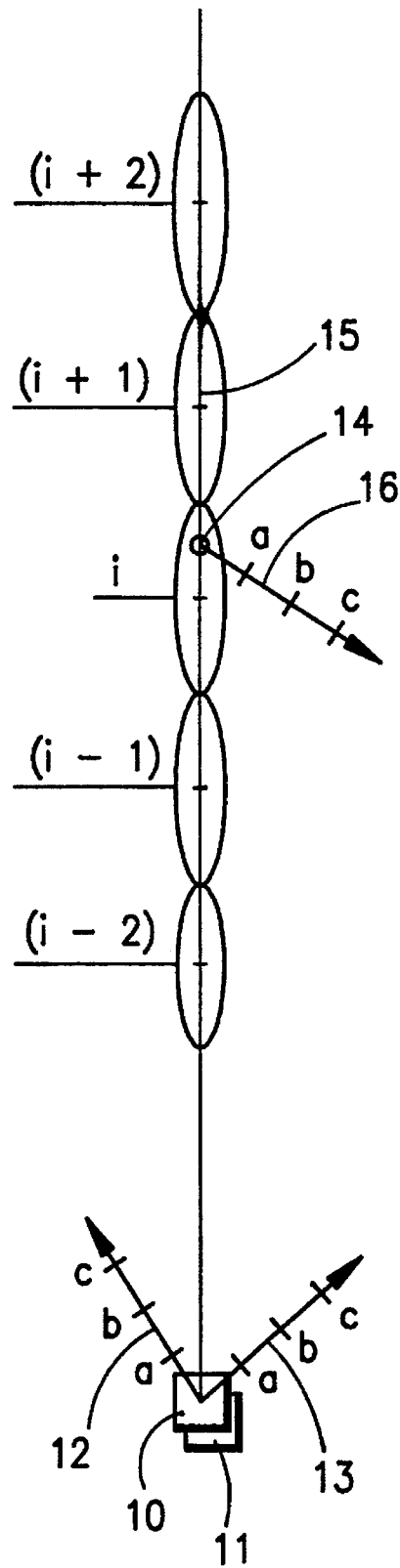
FIG. 2 shows the initial position for the determination of the position of a measurement object according to the method according to the invention.

FIG. 2 shows the initial position of the measurement method according to the invention. Initially, the two measurement stations 10 and 11 have the same positions but move along the paths 12 and 13, respectively, after the measurement has commenced, thus moving away from each other. The measurement object 14 is initially situated on the line of sight 15 and is assumed to move along the path 16. Indications are provided on the paths 12, 13 and 16 by the letters a, b and c. The indications denote the locations of the measurement station and the measurement object, respectively, at points in time a, b and c. In the following, the combination of the reference numeral of the path and any one of the letters a, b and c will be used for denoting the position of a measurement station or a measurement object along the path at a certain point in time. Thus, the reference numeral 12b denotes the position of the measurement station 10 on the path 12 at the point in time b.

A number of ellipses (i−2)−(i+2) have been arranged along the line of sight 15. These are constituted by areas within which the measurement object may be assumed to be located. These assumed areas—hypotheses—constitute the basis of the continuing measuring method.

The hypotheses are made up of a position (the midpoint of the ellipse) in the measured direction and at a distance $R_i$ which is the distance between the measurement stations and the i:th hypothesis. The measurement stations are assumed to be able to measure the direction to the measurement object with a certain angular accuracy $\pm\sigma_\phi$. The uncertainty area belonging to a certain hypothesis may be described as the ellipse whose minor axis has the length $2 \cdot R_i \sigma_\phi$ and whose major axis has the length $2 \cdot \sigma_{Ri} \cdot R_i$, and $\sigma_{Ri}$ is suitably chosen so that $\sigma_{Ri}/R_i$=constant. This means that the ellipses accomodate essentially the same angle, as seen from the side. It is also suitable to assume that the measurement object may move in an arbitrary direction but at a certain highest possible speed.

If no further measurements are made, the ellipses will grow in the course of time due to the fact that the measurement object may move.

Figure 3:
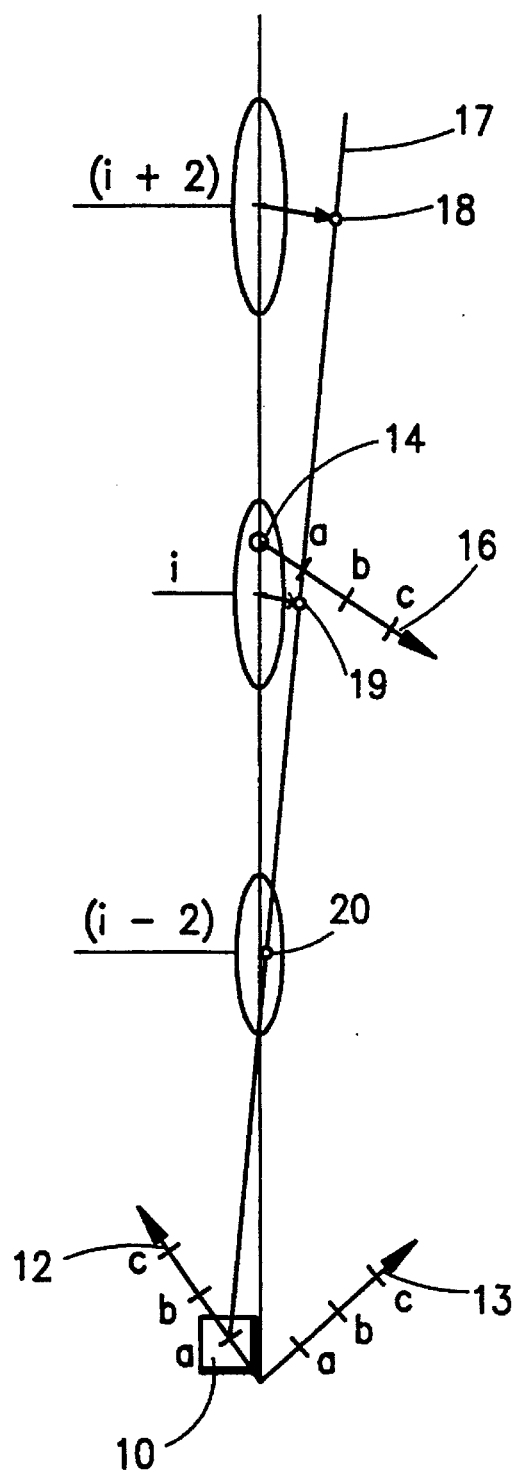
FIGS. 3–7 show subsequent measurements according to the method according to the invention.

In accordance with the invention, repeated angular measurements are however made with the measurement stations. FIGS. 3–7 illustrates a number of such measurements. FIG. 3 thus shows the point in time when the measurement station 10, at the point in time a, carries out an angular measurement towards the measurement object which then is located at the point 16a. The midpoints of the hypotheses will then be moved to the line of sight 17. The midpoint of the hypothesis (i+2) is thus located at the point 18, the midpoint of the hypothesis (i) at the point 19 and the midpoint of the hypothesis (i−2) at the point 20. In order to simplify the readability, only three hypotheses have been illustrated in FIGS. 3–7—the others being treated in a corresponding way.

Figure 4:
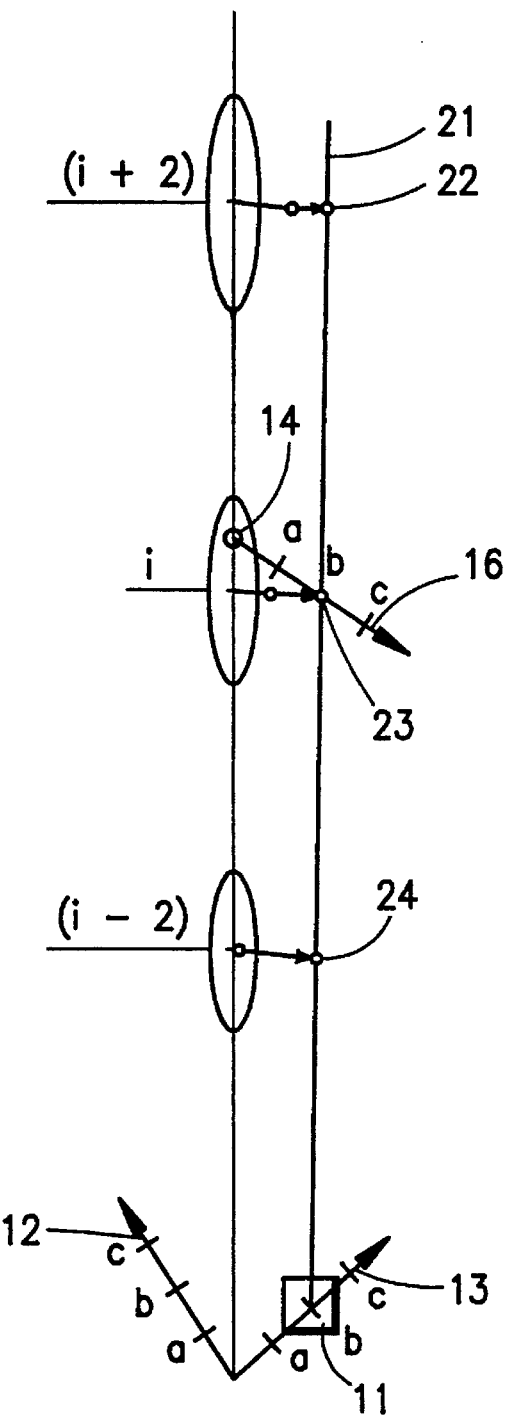

FIG. 4 shows the conditions when the measurement station 11 performs an angular measurement from the point 13b when the measurement object is located at the point 16b. The midpoints of the hypotheses are now located on the line of sight 21 at the points 22, 23 and 24, respectively.

Figure 5:
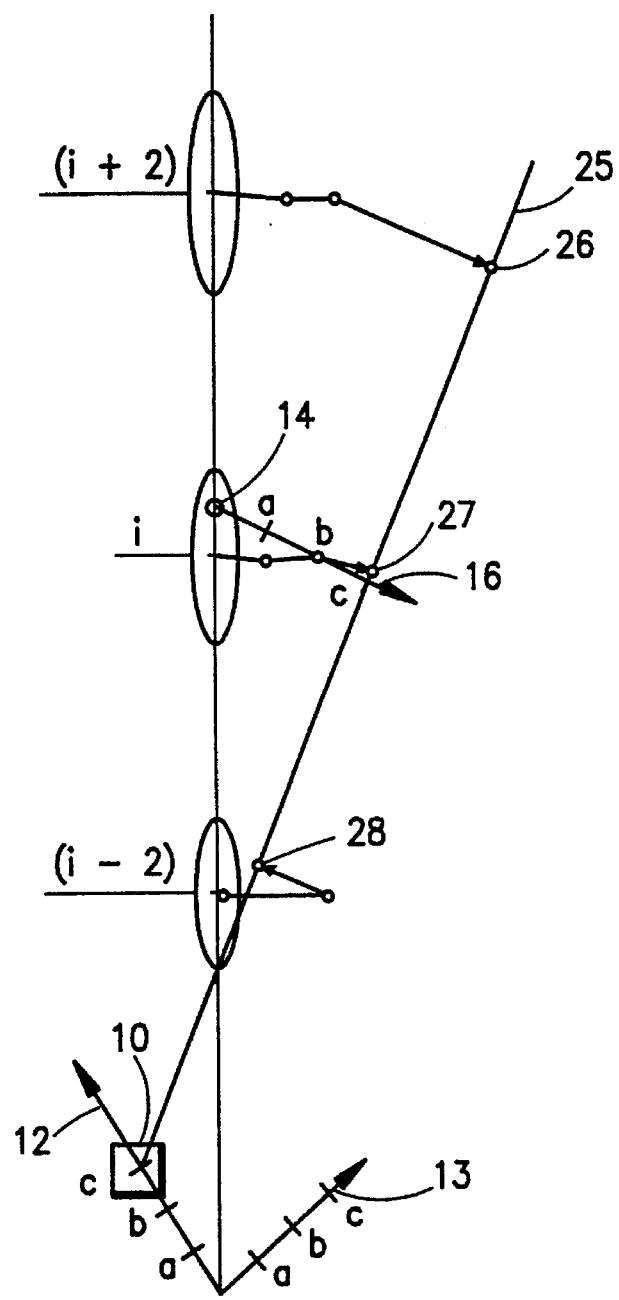
Figure 6:
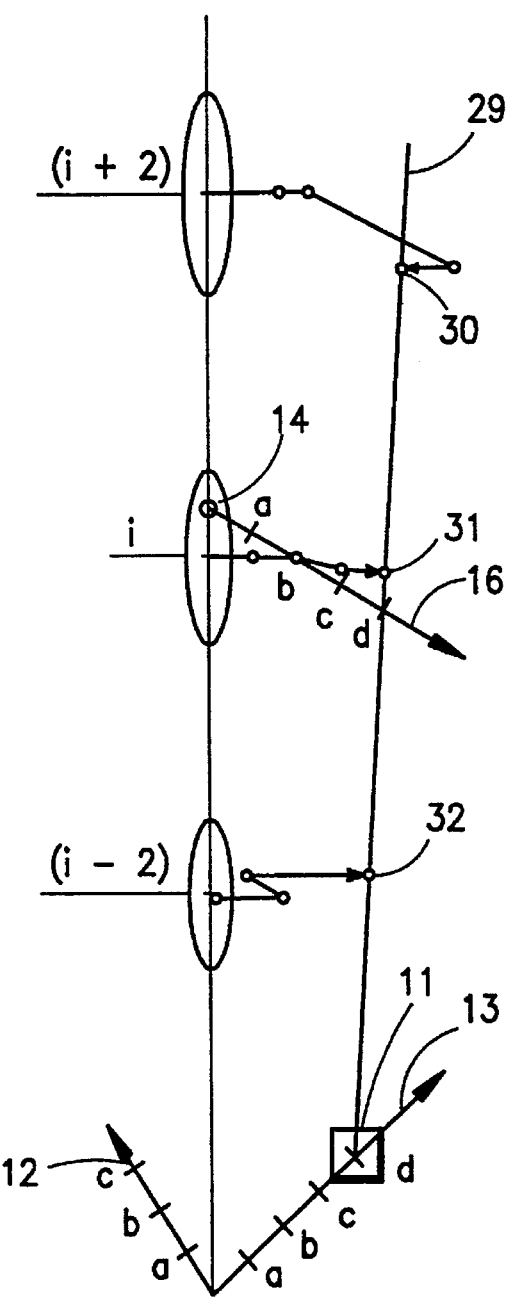
Figure 7:
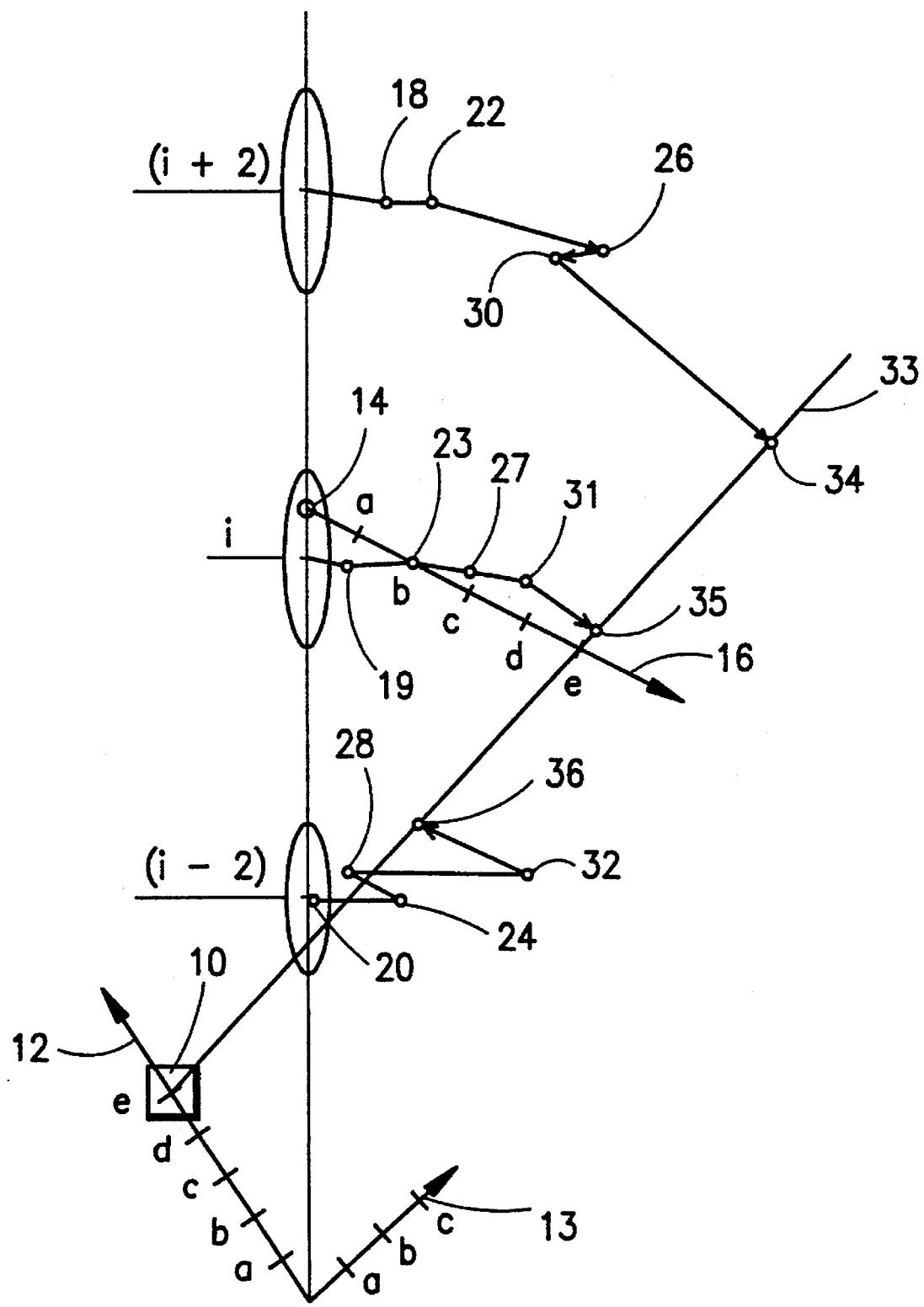

FIGS. 5–7 show in a corresponding way measurements from the points 12c, 13d and 12e, respectively. As is apparent from FIG. 7, the hypothesis (i+2) provides a path through the points 18, 22, 26, 30 and 34, the hypothesis (i) provides a path through the points 19, 23, 27, 31 and 35, and the hypothesis (i−2) provides a path through the points 20, 24, 28, 32 and 36.

Through use of recursive filters, the future position of each hypothesis is calculated. When an angular measurement has been performed, the calculated positions of the hypotheses are compared with the measured ones. Any differences between the calculated and the measured positions are added to the calculations, which thereby are gradually improved. Furthermore, the appearance of the different hypotheses are evaluated continously in order to allow a decision regarding which hypothesis corresponds best to the measurement object. During the time when the number of measurements increases, the accuracy of the evaluation will be improved and one or several hypotheses will appear as the most probable ones. In the shown example, the hypothesis (i) is the most probable one, whereas the hypotheses (i+2) and (i−2) are less probable. The hypothesis (i) is therefore assumed to represent the position of the measurement object.

During the evaluation, the positions of the hypotheses are compiled, whereby the obtained information is compared with the expected positions and performance of the measurement object. Furthermore, velocities, changes in speed, directions of movement and changes in the directions of movement etc. may be compared. By also comparing the information obtained from the hypotheses together with certain assumptions regarding the measurement object, for example the highest and the lowest velocity and the manoeuvring ability (accelerations), the accuracy of the evaluation may be further improved.

Compared with previously known methods for range estimation and position determination by angular measurements, the present method provides a number of advantages. A considerable time gain is accordingly obtained by carrying out measurements from two legs simultaneously. Furthermore, the first estimations of the probable position of the measurement object are obtained at an early stage, the accuracy of which is continously increasing as the measurements proceed. Another great advantage with the method is also that no precise time synchronization between the two measurement station is required. However, it is an advantage to treat the measurement results in the same order as the measurements were carried out.

According to a certain embodiment of the method, a so called symmetrical measuring in is utilized. This means that the measurement stations are moving mirror-symmetrically with reference to the original line of sight 15. The calculation work is considerably simplified in this case by means of the fact that the data of the hypotheses is not influenced by the movements of the measurement stations.

In the described embodiment it has been assumed that two measurement station have been utilized. There is however nothing that prevents the method being applied in cases where several measurement station are utilized. By the increasing number of measurements which results through this, the velocity and accuracy of the method will further increase.

Nor is it necessary that the measurement stations are at the same position in the initial stage. The directions to the measurement objects may yet be approximately the same seen from the measurement stations. For example, without affecting the method in any other respect, one of the measurement stations may be located on or close to the elongated line of sight, behind the other measurement station, i.e. at a greater distance from the assumed position of the measurement object.

The choice of ellipses for describing the hypotheses provides certain advantages during the calculation work. The method may however be used for other forms of hypotheses, for example rectangular, rhombic, triangular etc.

In order not to unnecessarily complicate the description, the description has been limited to a two-dimensional case in which the measurement stations and the measurement objects are assumed to be located in the same plane. Apart from that the underlying calculations will be more work-consuming, the method according to the invention may also be utilized in a three-dimensional case. The areas of the hypotheses limited by ellipses will in that case have an ellipsoidal shape.

Furthermore, the method may of course also be applied to more than one measurement object at the same time. Each measurement object is thereby treated individually by means of the fact that a number of hypotheses are initiated and followed for each measurement object. During the continuing measurements the positions of the hypotheses are, as has been described above, compared with the expected appearance of the corresponding measurement object, which are based upon assumptions regarding the properties of the measurement objects with respect to speed, manoeuvring capability etc.

The invention is not limited to the above-described embodiments, but may be varied freely within the scope of the appended claims.

What is claimed is:

1. Method for determining a position of a measurement object from a number of measurements of directions to the measurement object made at separate points in time, comprising the steps of:

for an initial measurement of the direction to the measurement object, generating a number of assumed areas within which the measurement object is assumed to be positioned, the assumed areas being assumed to be positioned along the direction to the measurement object;

subsequently measuring directions to the measurement object from at least two different measurement stations which are moved along different paths between the points in time;

in connection with the measurements of the direction to the measurement object, comparing the measurements of the direction with expected positions of the measurement object which, for each assumed area, are based on assumptions regarding the movement of the measurement object and differences between expected and measured positions; and selecting the assumed areas corresponding best to the expected positions of the measurement object as the positions of the measurement object.

2. The method of claim 1, wherein the assumed areas are areas limited by ellipses.

3. The method of claim 2, wherein during the initial measurement, half a length of minor axes of the ellipses are chosen to be equal to a measuring accuracy with which the direction to the measurement object is measured multiplied by a distance between the measurement stations and a midpoint of the respective ellipse, and half a length of major axes of the ellipses, which major axes are arranged along the direction to the measurement object, is chosen so that a relationship between the length of the major axes and the distance between the measurement stations and the midpoint of the respective ellipse is constant.

4. The method of claim 1, further comprising the step of determining velocities from the comparison between the measured direction and the expected position of the measurement object, which velocities are compared with at least one of highest and lowest assumed velocities of the measurement object.

5. The method of claim 1, wherein the measurements of the directions to the measurement object are made from two measurement stations which are moved along paths on opposite sides of an initial direction to the measurement object, away from the initial direction.

6. The method of claim 5, wherein the paths on opposite sides of the initial direction are arranged mirror-symmetrically with respect to the initial direction.

7. The method of claim 5, wherein the two measurement stations are initially in the same position.

8. The method of claim 5, wherein directions to the measurement object from the two measurement stations initially are substantially the same.

* * * * *